United States Patent [19]
James

[11] 3,888,651
[45] June 10, 1975

[54] INTERMITTENT DRIVE MECHANISM FOR GLASS MOLDING TABLE

[75] Inventor: Richard James, Anderson, Ind.

[73] Assignee: Lynch Corporation, Anderson, Ind.

[22] Filed: Dec. 10, 1973

[21] Appl. No.: 423,113

[52] U.S. Cl. .................................. 65/361; 91/275
[51] Int. Cl. .................................... C03b 9/00
[58] Field of Search ............ 65/207, 238, 108, 227, 65/160, 361; 91/275, 459

[56] References Cited
UNITED STATES PATENTS

| | | | |
|---|---|---|---|
| 854,236 | 5/1907 | Reichel | 65/238 |
| 2,565,749 | 8/1951 | Zappia | 65/361 |
| 2,803,110 | 8/1957 | Chittenden | 91/275 |
| 2,851,014 | 9/1958 | Healy | 91/275 X |
| 3,133,806 | 5/1964 | Brymer, Jr. | 65/227 X |

*Primary Examiner*—S. Leon Bashore
*Assistant Examiner*—Frank W. Miga
*Attorney, Agent, or Firm*—Molinare, Allegretti, Newitt & Witcoff

[57] ABSTRACT

In an intermittently operating glass making machine, an improved drive mechanism for imparting the desired intermittent or indexing motion in a forward direction to the mold carrying table. A support arm is mounted adjacent and is rotatable about the same upright axis as the mold carrying table. The support arm is movable in both forward and reverse directions. A drive pin selectively engages one of a plurality of apertures in the underside of the table adjacent the support arm. The drive pin is operatively carried by the support arm. When the drive pin engages the table, both the support arm and the table are moved simultaneously in the forward direction by a drive assembly. The drive pin is movable between a first position, at which the table and the support arm are interengaged for the desired simultaneous movement and a second position at which the table and the support arm are disengaged from each other. The drive assembly includes a hydraulic drive motor which is operatively interconnected by gears to the support arm for moving the support arm in both forward and reverse directions. A control means is responsive to the drive pin being located at the first position for causing hydraulic fluid to operate the hydraulic motor for moving the support arm and the table in the forward direction and is also responsive to the drive pin being located at the second position to operate the hydraulic drive motor to move the support arm in a reverse direction while the movable table remains in a stationary or fixed position.

3 Claims, 7 Drawing Figures

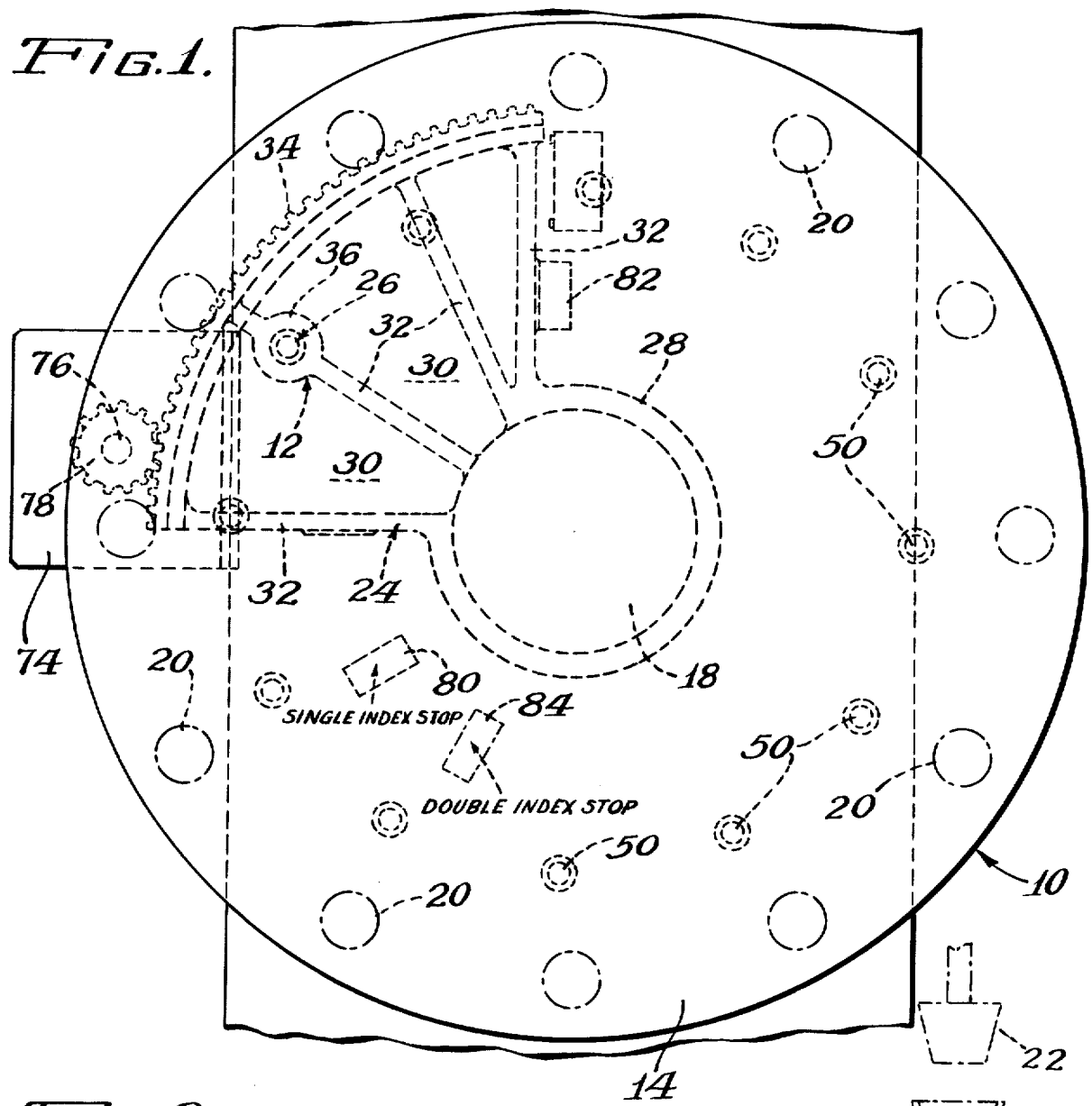
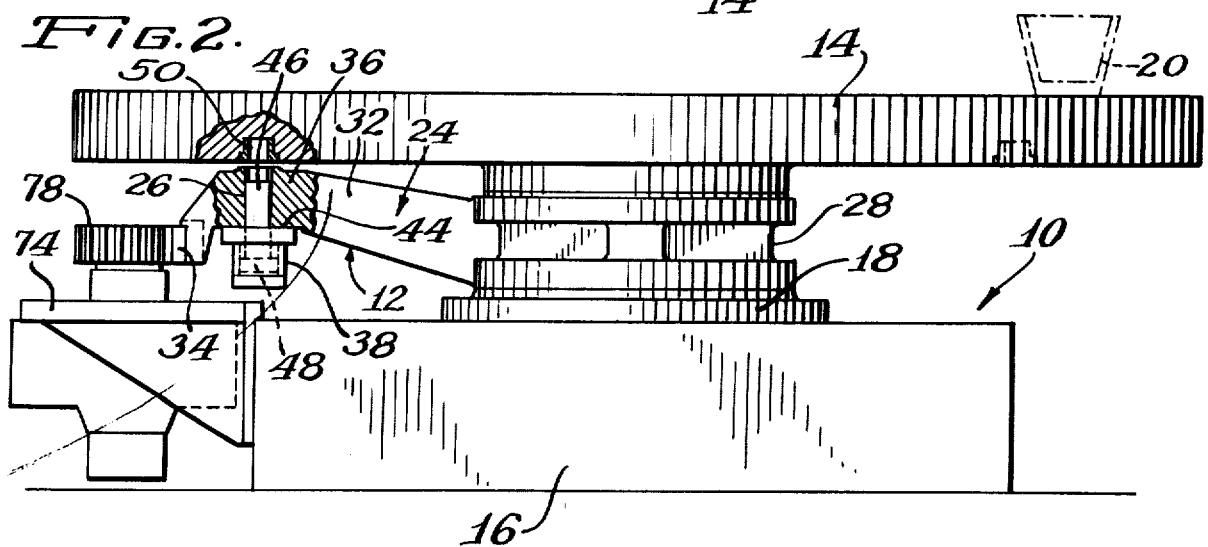

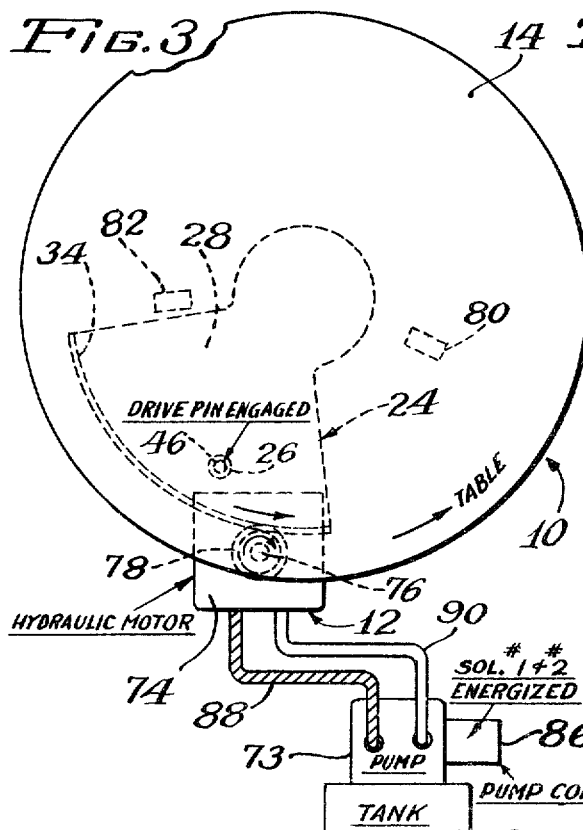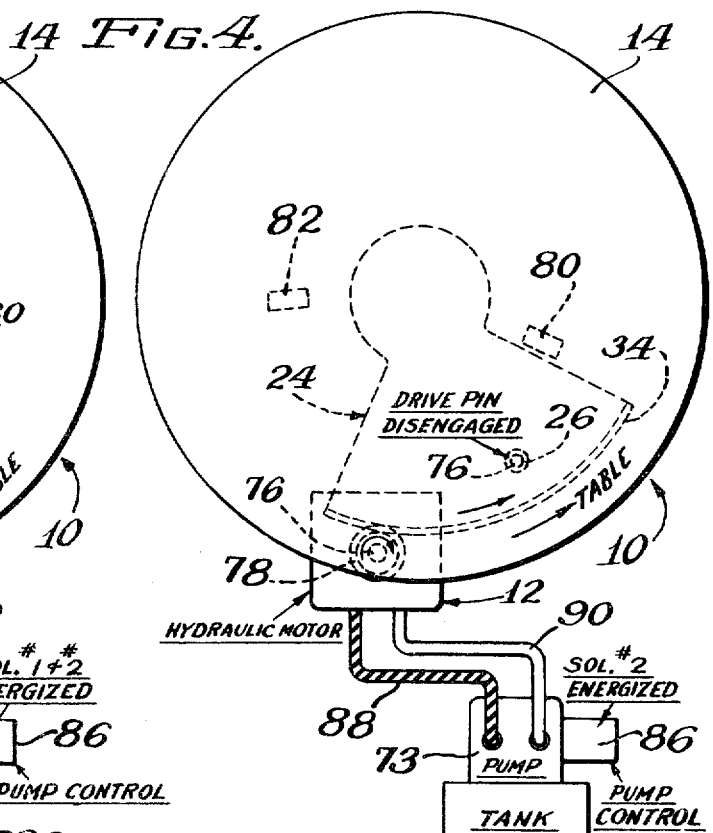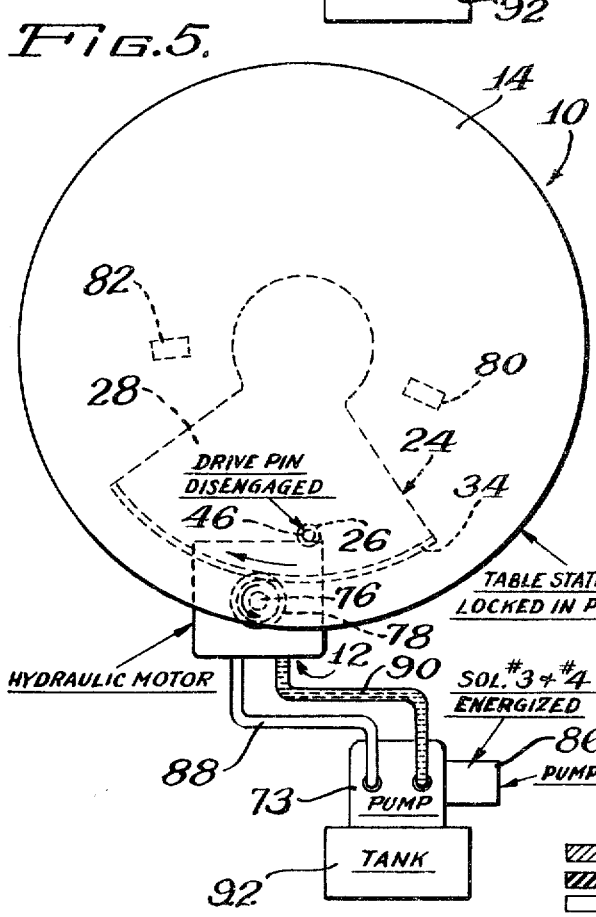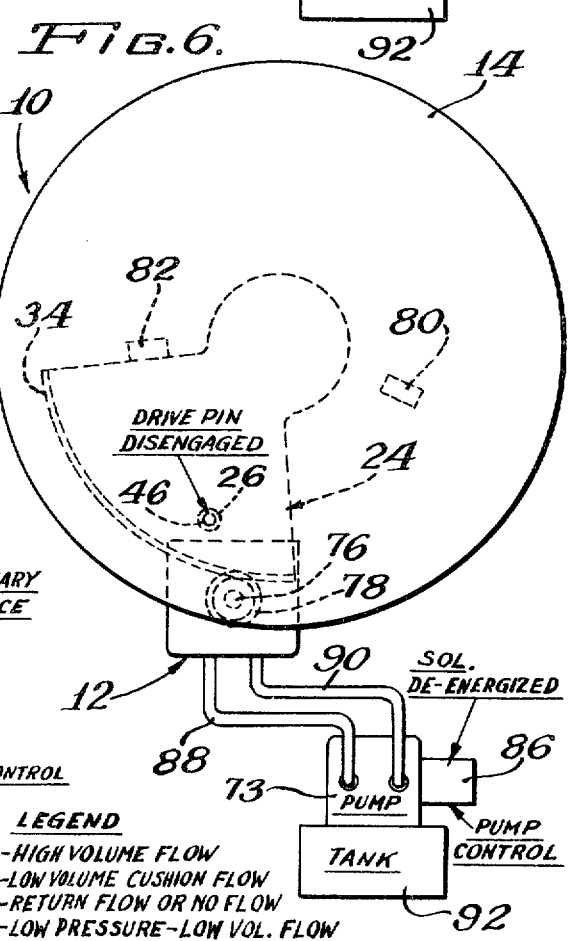

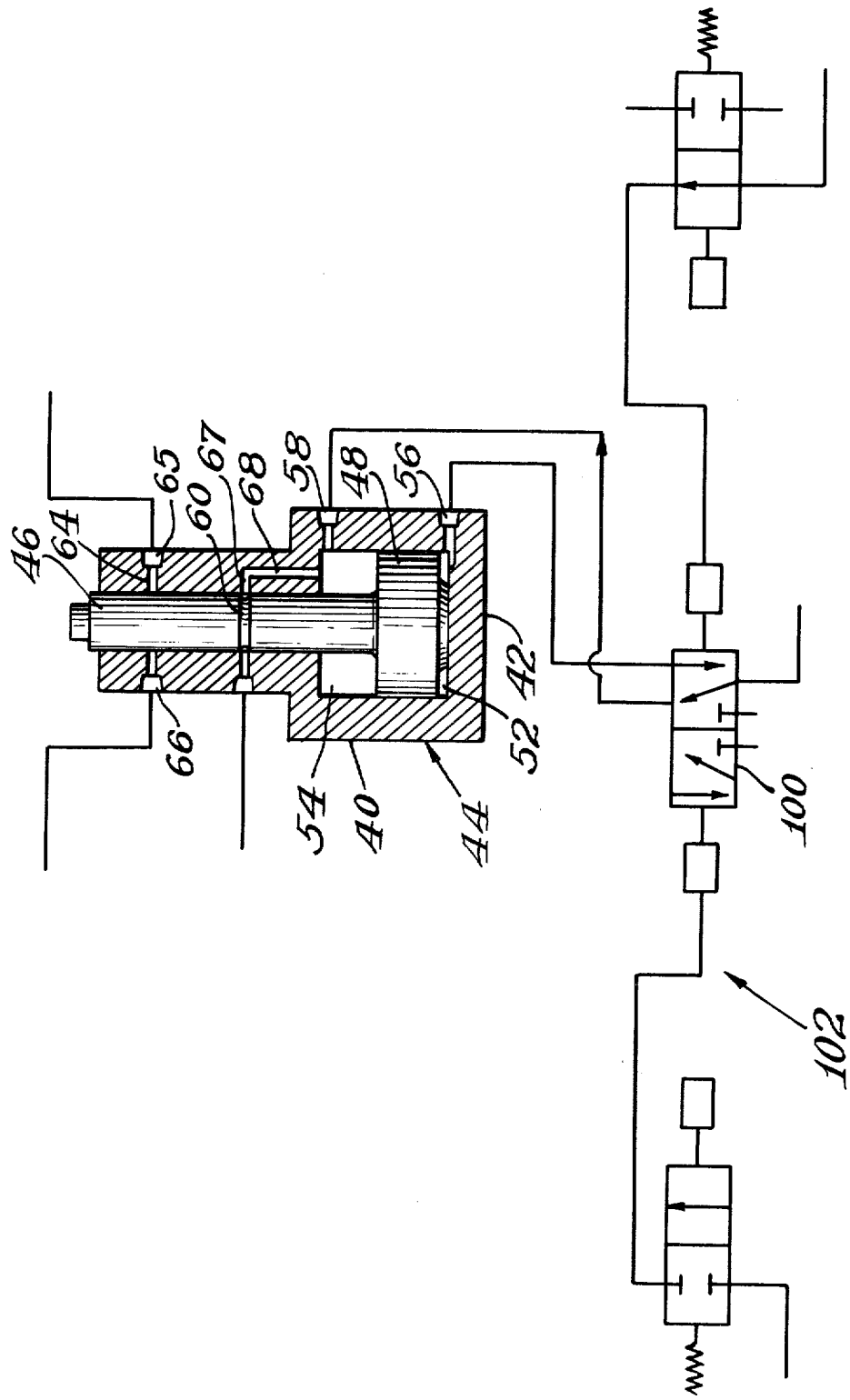

INTERMITTENT DRIVE MECHANISM FOR GLASS MOLDING TABLE

BACKGROUND OF THE INVENTION

FIELD OF THE INVENTION and DESCRIPTION OF THE PRIOR ART

This invention relates to an improved mechanism for imparting intermittent or indexing movement to a movable member, particularly a mold carrying, rotary table of an intermittently operating glass making machine.

There are many types of machines, particularly processing and manufacturing machines, which require intermittent or indexing motion. One such type of machine is an intermittent or indexing type of glass making machine. Basically, there are three types of glass making machines, including the continuous motion type, the individual section type, and the intermittently operating type. It is the last type of machine with which the mechanism of the present invention is directed, although not limited.

Glass making machinery is different from much other types of manufacturing equipment in that it is normally operated continuously for extended periods of time, that is, for periods of months—24 hours a day, 7 days a week. The reason for this is that the molten glass which is being formed into glass articles by the machine uses large quantities of molten glass which, once flowing, cannot be easily stopped. For the same reason, a breakdown in the glass making machine is considered extremely undesirable; if not catastrophic.

Probably one of the most critical parts of the glass making machine is in the drive mechanism therefor. Thus, if the machine drive mechanism does not operate the equipment in the desired manner, or if the mechanism breaks down, the glass flow must be stopped or, somehow, directed away from the equipment. For this reason, the drive mechanism of a glass making machine must be exceptionally reliable in operation.

There are presently, in commercial use, several different types of indexing drive mechanisms used in conjunction with the intermittently operating or indexing type of glass making machines. Among the indexing drive mechanisms now in use are the motor driven Geneva type, the barrel cam drive, and the air cylinder drive type. Geneva mechanisms generally are considered to be less than satisfactory because they have a fixed index and dwell times which creates problems at lower speeds. At lower speeds, as below a production rate of 30 units per minute, air drive mechanisms are considered more satisfactory. Generally, air drives are used for quick indexing of the machine while still allowing a greater dwell time, not permissible with motorized drive systems.

Since glass making machine tables are massive, large volumes of high velocity air are required to impart the desired movement to the table from the air cylinder drive. Such large volumes of high velocity air create relatively high noise levels and with regulations on noise levels required by OSHA standards, any reduction in noise levels is generally considered highly desirable. In addition, air cylinder drives require substantial quantities of air which, in turn, require relatively large amounts of energy.

Additionally, air cylinder drives commonly have problems in connection with possible breakage of parts of the machine as a result of air leakage and variations in compressability during the operation of the equipment. Those problems create further problems associated with controlling the proper positioning of the table for each indexing movement. Another common problem encountered in air cylinder drives is that during shutdown or in shipping, rust commonly develops in the drive cylinders. Thus, although air drive cylinders are generally satisfactory for their intended purpose, it would be highly desirable to overcome known problems generally encountered with air cylinder drive mechanisms, as well as other indexing drives, used in conjunction with indexing drive mechanisms for glass making machines.

SUMMARY OF THE INVENTION

It is therefore an important object of this invention to provide an improved indexing drive mechanism particularly for operating the mold supporting table of a glass making machine wherein many of the disadvantages of prior art indexing drive mechanisms for glass making machines are substantially avoided.

It is also an object of this invention to provide an improved indexing drive mechanism particularly for glass making machines wherein the rotation of the mold carrying table is accomplished by a hydraulic drive motor and gear arrangement.

It is a further object of this invention to provide an improved indexing drive mechanism, particularly for glass making machines, wherein minimal quantities of air are required for operating the indexing mechanism.

It is still a further object of this invention to provide an improved indexing drive mechanism for a glass making machine wherein the apparatus is particularly characterized by its reliability and capability of being operated continuously for extended periods of time.

It is still a further object of this invention to provide an indexing drive mechanism which significantly reduces noise levels during the operation of the equipment.

It is still another object of the invention to provide an improved drive mechanism for indexing a mold carrying table wherein the mechanism is particularly characterized by its economy and simplicity of construction and effectiveness and reliability in operation.

Further purposes and objects of this invention will appear as the specification proceeds.

The foregoing objects are accomplished by my improved drive mechanism which imparts intermittent motion in one direction to a mold carrying table of a glass making machine wherein the mechanism includes a support arm which is movable in both forward and reverse directions, a member which selectively engages the movable member and carried by the support member for simultaneous movement thereof in the forward direction, means for moving the engaging means between a first position at which the movable table and the support arms are engaged for the desired simultaneous movement, and a second position at which the movable table and the support arm are disengaged, a hydraulic drive motor which operatively moves the support arm by means of a pinion and a gear segment for movement of the support arm in both the forward and reverse directions, and control means responsive to the engaging means being at the first position for causing hydraulic fluid to operate the hydraulic drive motor to move the support arm and the table simultaneously in the forward direction only and also being responsive to the engaging means being at the second position to operate the hydraulic drive means to move the support arm only in a reverse direction while the table remains in a fixed position.

BRIEF DESCRIPTION OF THE DRAWINGS

A particular embodiment of the present invention is illustrated in the accompanying drawings wherein:

FIG. 1 is a top plan schematic view of a glass making machine having a mold carrying table using my improved indexing mechanism;

FIG. 2 is a side elevational, partially sectioned view of the embodiment of FIG. 1;

FIG. 3 is a schematic, top plan view of my drive mechanism as the drive mechanism is indexing the table;

FIG. 4 is a view, similar to FIG. 3, illustrating the mechanism as the table reaches the full forward indexed position;

FIG. 5 is a view, similar to FIGS. 3 and 4, wherein the hydraulic drive motor is reversing the support arm to the starting position for another indexing operation, while the table remains in the stationary or fixed position;

FIG. 6 is a view similar to FIGS. 3, 4 and 5 wherein the support arm has returned to the full start position, ready to begin another indexing operation; and FIG. 7 is an enlarged detailed schematic view illustrating the drive pin, carried by the support arm, for selectively engaging the mold carrying table for each incremental forward movement thereof, and also showing a portion of the control circuitry therefor.

DETAILED DESCRIPTION OF THE PREFERRED EMBODIMENT

Referring to FIG. 1 and FIG. 2, portions of a glass making machine, generally 10, are shown, including my improved mechanism, generally 12, for intermittently operating or indexing a rotary member, as a rotary, mold carrying table 14. The description herein of the mechanism 12, will relate to the use thereof in the glass molding machine 10, particularly for indexing the mold carrying table 14. It is to be understood, however, that the mechanism 12, may be used for indexing purposes in machines other than for the rotary tables of glass making machines. Thus, for purposes of simplicity in description, the preferred embodiment of the mechanism 12, will be described in conjunction with one of the most important applications for the indexing mechanism 12, that is, for indexing the rotary table 14 of the intermittenly operating glass making machine 10.

Only portions of the glass making machine 10 are shown and these portions include a base 16 which rests on a horizontal support surface, a central column 18 projecting upwardly from the base and which rotatably supports the rotatable table 14. The table 14 is rotatably carried by the column 18 by use of suitable bearings (not shown). The table 14, as shown, is substantially circular in plan view and is supported for rotational movement about the upright axis of the upright column 18. The glass making machine 10 has a plurality of molds, such as the mold 20, schematically shown in hiden view, fixedly supported on the upper surface of the table. Only one such mold 20, is shown, although it is to be understood that a plurality of such molds, as schematically illustrated by the circular representations in FIG. 1, are fixedly mounted thereon. The molds 20, shown in the drawings, are located approximately 30° apart, and the 30° angular spacing represents the amount of indexing or incremental movement which is imparted to the table 14. Although in the following description and in the accompanying drawings, the machine 10 has 12 mold stations which are spaced equidistantly apart, as 30°, it is to be understood that the number of molds and incremental movement may vary. For example, if 16 molds are used, the mold spacing is 22½°. Each incremental movement of the table is substantially the same.

In a conventional indexing type of glass making machine 10, the upwardly opening molds 20 must be indexed to a delivery station (not shown) at which a molten glass gob is delivered by a delivery mechanism (not shown) into the open top of the mold 20. The mechaism table is then indexed to a station (not shown) at which a cooperating arm 22 schematically shown in FIG. 2, is reciprocated downwardly into the mold 20 so as to form the glass product between the mold 20 and the ram 22. The table 14 continues the indexing movements to allow time for the glass product, thus formed, to be cooled and set and to have the glass product or ware removed by a take-out mechanism (not shown). The indexing mechanism 12 of the invention accomplishes the desired indexing movement for the table 14 in a convenient, positive and efficient manner.

The drive mechanism 12 includes a rotatable support arm, generally 24, a drive pin assembly, generally 26, used for drivably interconnecting the support arm 24 to the rotary table 14, and a hydraulic drive assembly, generally 74, which imparts the desired rotary movement to the support arm 24 and thereby to the rotary mold carrying table 14.

The support arm 24 includes an annular central support portion 28 which is rotatably supported by the central column 18 of the machine 10. A support web 30, projects laterally outwardly from an arcuate segment of the annular support 28. The web 30, in plan view, is approximately 85° in arcuate plan view and the web 30 includes a plurality of upright radial support sections 32 with portions of the web 30 being positioned between the upright section 32. The outer periphery of the web 30 of the annular support portion 28 terminates in a gear segment 34 which is unitary with or integral with the outer periphery of the annular support 28.

The drive pin assembly 26, as seen best in FIG. 2, is vertically and reciprocally mounted within one of the radial sections 32 of the annular support 28. A cylindrical reinforcement 36 is provided in one of the middle radial sections 32 of the annular support 28, in close proximity to the gear segment. The reinforcement 36 is aligned with a cylinder portion 38 which is fixedly secured to the underside of the web 32 and in axial alignment with the reinforcement 36. The cylinder portion 38 comprises a cylindrical wall portion 40 and a closed lower or bottom wall 42. The cylinder portion 38 and the reinforcement 36 cooperate to define an air cylinder chamber 44.

A reciprocal drive pin 46 is reciprocally mounted within the cylinder chamber 44 defined by the cylinder portion 38 and the web reinforcement 36. The lower portion of the pin 46 has a piston 48 defined thereon for reciprocal movement within the cylinder portion 38 and pressure chambers are defined on the opposite sides of the piston 48. The pin 46 is reciprocal between a lower position, as seen in FIG. 2, where the pin 46 is retracted completely into the support arm 24 and disengaged from the table 14 and an upper position where the pin 46 projects upwardly from the support arm 24 and is in positive engagement with one of a plurality of wells 50 located in the underside of the machine table 14. The wells 50 are desirably positioned axially below each of the molds 20 and the arcuate spacing of the wells 50 is, therefore, the same as the arcuate spacing of the molds, as about 30° in the embodiment illustrated in the drawings, although the arcuate spacing is dependent on the number of equally spaced molds.

Referring to FIG. 7, there is shown a detailed view, partially broken, of the control circuitry for operating the drive pin assembly 26. The piston 48 has a lower pressure chamber 52 and an upper pressure chamber 54 defined on its opposite sides in the chamber 44. The lower chamber 52 communicates with a lower pressurized air inlet 56, and the upper chamber 54 communicates with an upper air inlet 58. As will be described hereinafter, pressurized air is used for reciprocating the piston 48 and thereby the pin 46 for engaging the pin with and disengaging the pin 46 from successive wells 50 in the underside of the rotary mold carrying table 14.

The central portion of the pin 46 has a peripheral groove 60 defined thereon. An upper vent line 64 in the cylinder 44 aligns with the groove 60 when the pin 46 is in the raised indexing position. The vent line 64 has an inlet port 65 and a vent port 66. A lower vent line 67 in the cylinder 44 is shown aligned with the groove 60 when the pin 46 is in the lowered, reverse position. The vent line 67 communicates with the upper cylinder chamber 54 through the line 68. The lines 64, 67, and 68 and the groove 60 cooperate to define a pilot valve system for controlling the table indexing, in a manner to be hereinafter described in greater detail.

The drive mechanism 12 comprises a hydraulic drive pump 73 and motor 74, which is operable in both forward and reverse directions. An upright drive shaft 76 extends from the hydraulic motor 74 and non-rotatably carries a drive pinion 78 which meshes with the gear segment 34 which is rigidly secured to the arm assembly 24.

Preferably, suitable stops are positioned on the base 16 for engaging the arm assembly 24 to assure that the table 14 indexes to the proper stop position for each indexing operation. As seen in FIGS. 1 and 3–6, a forward stop 80 is provided for engaging a leading edge of an arm section 32 while a reverse stop 82 is provided for engaging the leading edge of the arm 32 to stop the reverse movement of the rotary arm assembly 28 when the machine 10 is operating with the single gob delivery and a single product take out. An index stop 84, as seen in FIG. 1 only, is provided when a double glass gob delivery or a two station index is utilized.

The operation of the indexing drive mechanism 12, will be more clearly understood by referring to the schematic views illustrating the cycle of operation of the indexing mechanism 12, as seen in FIGS. 3 - 6.

Referring to FIG. 3, the rotary table 14 and drive mechanism 12 are shown as the table is moving in a forward direction in an indexing operation. The indexing mechanism 12 and table 14 are shown just as the indexing movement is begun. In order to commence the indexing operation, air pressure is applied through the lower air inlet 56 through the valve 100 of the control system, generally 102, partially shown in FIG. 7, to introduce air pressure to the lower air cylinder chamber 52 to drive the piston 48 and thereby the pin 46 upwardly until such time as the pin 46 positively engages one of the wells 50 in the undersurface of the table 14.

When the pin 46 is completely engaged in a well 50, the alignment of the groove 60 with the vent line 64 causes pressurized air to pass through the ports 65 and 66 and to be directed to an air operated limit switch (not shown) connected to port 65. When this limit switch closes, electrical circuits of solenoid Nos. 1 and 2, schematically shown in FIGS. 3 - 6 and defining part of the pump control assembly 86, are both energized. This causes a high volume flow of pressurized fluid to pass from the pump 73 to the motor 74, through the pressure line 88 for rotating the drive shaft 76 and thereby the pinion 78. The return line 90 is opened, permitting exhaust hydraulic fluid to pass to the hydraulic fluid supply tank 92 since solenoid Nos. 1 and 2, controlling the flow of hydraulic fluid in both lines 88 and 90 are energized. Since the pinion 78 engages the gear segment 34, counterclockwise rotary motion, as viewed in FIGS. 3 and 4, is imparted to the arm assembly 24. Since the pin 46 is engaging a well 50 in the table 14, rotary motion is imparted to the table 14 for the indexing operation.

Referring to FIG. 4, when the drive motor 74 has driven the table 14 to a position near the end of the indexing operation, a first limit air valve (not shown is tripped by a cam (not shown) on the arm assembly 24 and air is directed to a first air operated limit switch (not shown) and the pump solenoid No. 1 of the pump control 86 is de-energized causing a low volume hydraulic flow to pass from the pump 73 to the hydraulic motor 74. This operation cushions the movement of the rotator arm 24 to provide a smooth stop of the arm 24 and the table 14. The index stop 82 contacts the arm assembly 24 to assure that the arm 24 stops after the desired rotation.

Just before the arm 24 approaches the mechanical stop 82, a second trip valve (not shown) is engaged and air operates a second air operated limit switch (not shown). This operation de-energizes the pump solenoid No. 2 to stop flow from the pump 73, thereby stopping flow pressurized hydraulic fluid to the hydraulic motor 74 and also stopping the rotation of the pinion 78, the segment 34, the arm 24, and the table 14.

As the indexing operation moves the table 14 to a complete stop, an air pilot valve (not shown which is mechanically operated by the arm 24, momentarily sends a signal to a five-point valve (not shown) for changing flow of pressurized air from the lower air inlet 56 to the upper air inlet 58, so that pressurized air is directed into the upper chamber 54 for moving the piston 48 and thereby the drive pin 46 downwardly and out of engagement with the well 50 in the table 14. When the piston 48 and pin 46 have been moved to a full down position, the groove 60 re-aligns with the line 67. Air is then directed to still another air operated limit switch (not shown) which, in turn, energizes the pump solenoid Nos. 3 and 4 in the pump control 86.

Low pressure, low volume hydraulic fluid passes through the return line 90 and exhaust fluid passes back through the line 88 to rotate the pinion 48 in a reverse direction. The hydraulic motor 74 continues operating to return only the arm 24 to the start position. Since the pin 46 is disengaged from the table, the table 14 remains stationary in the indexed position during the return movement of the arm 24.

When the arm assembly 24 approaches the return stop 80, another air valve (not shown) is tripped just before the mechanical return stop 80 is contacted. As seen in FIG. 6, both solenoid Nos. 3 and 4 are then de-energized, stopping flow from the pump 73 to the hydraulic motor 74. The rotator arm 24 is cushioned to a stop position and remains in the standby position until the next indexing operation commences.

While in the foregoing, there has been provided a detailed description of a particular embodiment of the present invention, it is to be understood that all equivalents obvious to those having skill in the art are to be included within the scope of the invention, as claimed.

What I claim and desire to secure by letters patent is:

1. Apparatus for imparting intermittent motion to a glass mold supporting table, said apparatus comprising, in combination, a base, a substantially horizontal mold supporting table carried on said base for movement in a forward direction only, an arm carried on said base for movement in a forward direction for a preselected distance, and in a reverse direction for said preselected distance, drive means for selectively moving said arm in said forward and reverse directions, a movable connector member carried on said arm, a plurality of spaced receiving means on said base for receiving said connector member, and means for moving said connector member into interlocking relationship with one of said receiving means when said arm is moved in said forward direction by said drive means and for moving said connector member from said interlocking relationship when said arm is moved in said reverse direction while said table remains in a stationary condition.

2. A mechanism of claim 1 including a plurality of equiangularly spaced molds supported on said table, and wherein said receiving means are equiangularly spaced at the same angular spacing as said molds, and both said table and said arm are rotatable about an upright axis, with said arm being positioned adjacent and below said table.

3. The mechanism of claim 1 wherein said drive means comprises a hydraulic motor on said base, a gear driven by said hydraulic motor in forward and reverse directions, and a gear segment on said arm operatively intermeshing with said gear for movement of said arm in said forward and reverse directions.

* * * * *